UNITED STATES PATENT OFFICE.

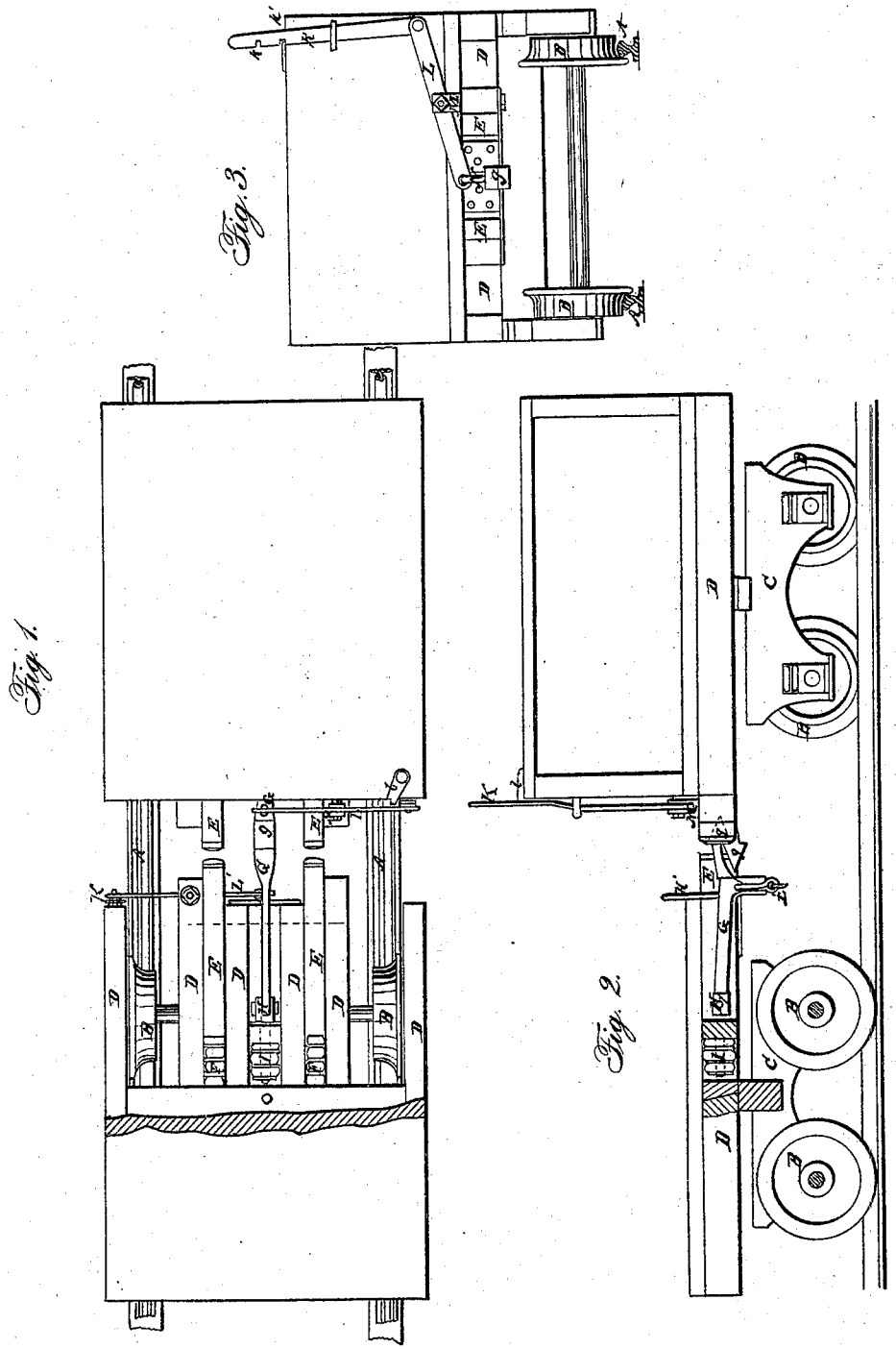

ROBERT G. FOWLER, OF OLNEY, ILLINOIS.

IMPROVED CAR-COUPLING.

Specification forming part of Letters Patent No. 58,090, dated September 18, 1866.

*To all whom it may concern:*

Be it known that I, ROBERT G. FOWLER, of Olney, in the county of Richland and State of Illinois, have invented a new and useful Improvement in Car-Couplings; and I do hereby declare the following to be a full, clear, and exact description of the same, sufficient to enable one skilled in the art to which the invention appertains to make use of it, reference being had to the accompanying drawings, which form a part of this specification, and in which—

Figure 1 is a plan, a part of the platform being removed. Fig. 2 is a side elevation, a part of the side of the car being removed to exhibit the working parts. Fig. 3 is an elevation.

The same letters refer to like parts in the different figures.

The improvement consists of two coupling-bars, with wedge-shaped heads, which slip past and catch behind each other, and so arranged that when a car leaves the track or plunges down a bank or from a bridge the connection between it and the following car shall be severed automatically.

In the drawings, A is the track, and B B the wheels supporting the truck C of the car. D is the bed of the car, which is provided with buffers E E, to moderate the effect of concussion by contact with similar arrangements on the colliding car, the springs F in the rear of the buffer-bars forming an elastic bearing behind them.

Centrally arranged as to the width of the bed is a draw-head or coupling-bar, G, having a wedge-shaped head, $g$, the point being presented away from the car to which it is attached, and ready to couple with a similar head on the coupling-bar of the other car, as seen in Fig. 2.

The coupling-bar G is pivoted at H to a bolt, which passes to the rear through the spring I, and is there attached to a plate, so that a draft upon the bar G in starting the cars condenses the spring I and lessens the jar in starting up. The coupling-bar, being pivoted at H to a horizontal axis, has a vertical adjustability, which may be by one of the wedges $g$ slipping upon the other, or it may be produced by a lever which is arranged and operated in one way for a freight-car, and in another way for a passenger-car, the respective modes being shown in Fig. 2 on the two cars represented in that figure.

The arrangement shown in the right-hand car, Fig. 2, and in elevation, Fig. 3, is adapted for a freight-car, so as to be manipulated from the roof by means of the rod K, which is pivoted to the lever L, which has its bearings in the standard M rising from the platform of the car.

The link N connects the inner end of the lever L to the coupling-bar G, and the bar is retained in its upper or lower position by the catching of the notch $k$ or $k'$ in the plate $l$ on the top of the car, or by other detent, which may be conveniently arranged on the end of the car or upon the platform.

When the lever is in the position shown in Fig. 3 the coupling-bar G is held down, so as not to be accidentally uncoupled by the jars incident to the motion of the train; but if the notch $k$ be engaged with the plate $l$ the outer end of the lever is depressed, and the coupling-bar is retained in an elevated position, so as not to couple by contact with another car, in cases where the coupling is not desired.

An arrangement similar in some respects is provided upon the left-hand car, Fig. 2, which differs from the former in this respect, that it is adapted for a passenger-car, in which the arrangement of the rod K and lever L is inadmissible upon the car-platform.

In the arrangement for the passenger-car the rod K' protrudes but a small distance above the platform, and the lever L' is below, connected as before by a link with the coupling-bar G, and susceptible by notches upon the rod and a plate on the car to be adjusted, to be locked in a raised or depressed position, as before explained.

It will be seen that the breadth of contact of the respective draw-heads upon each other permits a certain amount of lateral play, the one upon the other, without loss of contact; but if by an accident one car leaves the track, the bar of that car slips laterally from its hold upon the coupling-bar of the car to which it is attached and becomes uncoupled, so that it does not necessarily involve the succeeding car in the effects of its own accident; also, should a car plunge downward into a gorge or watercourse by the failure of the road, the point of the lower head, $g$, by contact with the under side of the coupling G, to which it is allied, will raise one draw-bar or sink the other, so as to break the contact of the butts of the wedge-shaped heads, $g g$, and uncouple the cars. The parts are so arranged and proportioned that this effect is not produced by the ordinary jars, by the swaying of the cars, by their undulating motion, nor by the passage of the cars around curves of short radius.

Having described my invention, what I claim therein as new, and desire to secure by Letters Patent, is—

The jointed coupling-bars G G, having springs I and wedge-shaped heads $g g$, which slip upon and catch behind each other, permitting the automatic uncoupling by lateral or vertical deflection of one car relatively to the other, under the circumstances described.

To the above specification of my improvement in car-couplings I have signed my hand this 4th of September, 1866.

ROBT. G. FOWLER.

Witnesses:
EDWARD H. KNIGHT,
SOLON C. KEMON.